United States Patent [19]
Franks et al.

[11] 4,166,080
[45] Aug. 28, 1979

[54] NYLON 6 HAVING IMPROVED AFFINITY FOR CATIONIC DYES

[75] Inventors: Neal E. Franks, Enka; Carol L. Drinnan, Asheville, both of N.C.

[73] Assignee: Akzona Incorporated, Asheville, N.C.

[21] Appl. No.: 939,145

[22] Filed: Sep. 1, 1978

Related U.S. Application Data

[63] Continuation of Ser. No. 716,322, Aug. 20, 1976, abandoned.

[51] Int. Cl.² ............................................ C08L 77/00
[52] U.S. Cl. .................................... 525/183; 526/303

[58] Field of Search ................................. 260/857 UN

[56] References Cited

U.S. PATENT DOCUMENTS 3,865,900  2/1975  De Caprio ................... 260/857 UN Primary Examiner—Paul Lieberman
Attorney, Agent, or Firm—Francis W. Young; Jack H. Hall

[57] ABSTRACT

Nylon 6 containing a metal salt of a copolymer of a vinyl ether and 2-acrylamido-2-methylpropanesulfonic acid to improve its affinity for cationic dyes is provided.

11 Claims, No Drawings

NYLON 6 HAVING IMPROVED AFFINITY FOR CATIONIC DYES

This is a continuation of application Ser. No. 716,322, filed Aug. 20, 1976 now abandoned.

This invention relates generally to polycaproamides (nylon 6) and, more particularly, to a method of improving the dyeing characteristics of shaped articles of polycaproamides.

It has been proposed in U.S. Pat. No. 3,506,707 to improve the affinity of acrylonitrile copolymers for cationic dyes by the addition of an alkylamido-alkane sulfonic acid monomer or a salt thereof to the copolymer. It has also been proposed in British Pat. No. 995,802 to improve the dyeing characteristics of polypropylene by the addition of the sodium salt of a copolymer of alkylamidoaklane sulfonic acid and ethylene thereto. Moreover, in accordance with the disclosure in U.S. Pat. No. 3,865,900 the affinity of nylon 6 for cationic dyes is improved by the addition of an alkali metal salt of a polymer or copolymer of 2-acrylamido-2-methylpropanesulfonic acid. However, as described in the patent, it is necessary to minimize the polymerization time of the nylon 6 when the alkali metal salt of a polymer or copolymer of 2-acrylamido-2-methylpropanesulfonic acid is used because as polymerization time increases, the concentration of sulfonates retained through subsequent washing and dyeing steps decreases.

It is therefore an object of this invention to provide a method for improving the affinity of a polycaproamide for cationic dyes which does not require minimizing the polymerization time of the caprolactam. Another object of the invention is to provide shaped articles of polycaproamide having improved affinity for cationic dyes. A more specific object of the invention is to provide polycaproamide fibers having improved dyeing characteristics and a method for making them.

The foregoing objects and others are accomplished in accordance with the invention, generally speaking, by providing a polycaproamide (nylon 6) containing a sufficient amount of a salt of a copolymer of a vinyl ether and 2-acrylamido-2-methylpropanesulfonic acid. In practicing the invention the copolymer salt is mixed with caprolactam and the mixture is subjected to polymerization until a nylon 6 of the desired molecular weight is obtained. The nylon 6 may be prepared by any suitable polymerization process such as, for example, as disclosed in U.S. Pat. Nos. 2,071,250 and 2,071,253. Any suitable molecular weight nylon 6 may be used such as one having a molecular weight of about 20,000 to 100,000.

It has been found that, contrary to the disclosure in U.S. Pat. No. 3,865,900, caprolactam can be polymerized while containing the copolymer provided by this invention for the normal length of time and the copolymer will be retained by the resulting nylon 6 almost completely through the subsequent washing and drying processes. In some cases the weight percent of the copolymer increases after the washing and drying steps because of the loss of weight by the polymer system when the carpolactam monomer is washed out.

The alkali metal salt of the copolymer of a vinyl ether and 2-acrylamido-2-methylpropanesulfonic acid may be represented by the following general formula, it being realized that the exact properties and arrangements may vary:

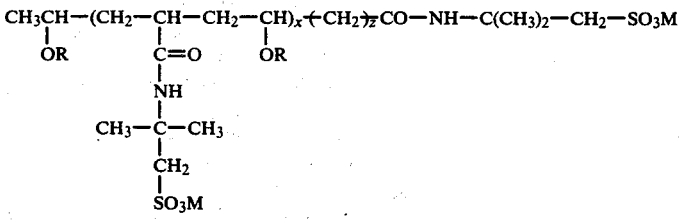

wherein x is 150 to 1000, R is an alkyl radical and M is an alkali metal taken from Group Ia of the Periodic Table such as sodium, potassium and lithium.

The polycaproamide should contain sufficient vinyl ether copolymer of the above formula to improve the affinity of the polymer to cationic dyes and preferably from about 1% to about 5% by weight based on the weight of the polycaproamide.

Any suitable alkyl vinyl ether may be used in making the copolymer but it is preferred that the alkyl radical of the vinyl ether contain from 4 to 20 carbon atoms. A conventional polymerization process can be used in preparing the copolymer and also in preparing the nylon 6 containing the copolymer provided by this invention for improving the affinity of the nylon 6 to cationic dyes. For example, the alkali metal salt of the copolymer may be prepared either by an aqueous emulsion polymerization process or by solution polymerization. Generally speaking, in preparing the vinyl ether copolymer, an alkali metal hydroxide or carbonate is dissolved in water, 2-acrylamido-2-methylpropanesulfonic acid is mixed with the solution and the alkyl vinyl ether and a suitable initiator are mixed therewith. The mixture is then heated, water is removed and the polymer is recovered by trituration in an alcohol. Alternately, the copolymer may be prepared by mixing potassium carbonate with water and dimethylformamide and then with 2-acrylamido-2-methylpropanesulfonic acid. The resulting mixture is then heated with an alkyl vinyl ether and an initiator and stirred while heating to a temperature of about 60° C. until a polymer is obtained. Any suitable free radial initiator such as an organic peroxide can be used. The polymer is recovered by filtration and washing with hexane and drying in vacuo.

In the following examples all parts are by weight unless otherwise specified. In these examples and the following tables, "AMPS" is used to identify 2-acrylamido-2-methylpropanesulfonic acid and "KAMPS" is used to identify the potassium salt thereof.

EXAMPLE 1

Preparation of Isobutyl Vinyl Ether Copolymer via Aqueous Emulsion

About 17 grams potassium carbonate were dissolved in about 122.5 ml distilled water. This solution was chilled and 51.75 g AMPS was slowly added to the stirred solution. This solution was stirred for approximately 15 min. at room temperature. The pH was adjusted to 7.5 with additional $K_2CO_3$. The pH corrected solution was decolorized with charcoal and the charcoal was removed by filtration through Celite. The filter bed was washed with an additional 40 ml of distilled water.

The combined filtrate and washings were transferred to a 1 liter 3 neck round bottom flask equipped with a reflux condenser, $N_2$ bubbler, and external stirrer. About 25 g. i-butyl vinyl ether, 0.3 ml Tween 20 and 0.3 g of Span 60 were added with stirring. Nitrogen purging was begun and after 45 min., the temperature was raised to 55°–60° C.

After 60 min. purging, about 20 ml of 2-propanol and 405 mg of azo-bis-isobutyronitrile (AIBN) initiator were introduced into the polymerization vessel. The temperature was increased to 70° C. After 2 hours of stirring, about 405 mg of potassium persulfate were added. The polymerization was continued for an additional 4 hrs. at 70° C. The mixture was allowed to stand at room temperature overnight. The 2-propanol and most of the water were removed under reduced pressure. The polymer was recovered by trituration of the viscous residue into methanol. The viscosity (Brookfield) of a 10% aqueous solution of the dried polymer was 55 centipoise at 25° C.

EXAMPLE 2

Preparation of Isobutyl Vinyl Ether Copolymer via a Solution Polymerization

About 18.5 g of potassium carbonate were suspended in a chilled mixture of about 25 ml of distilled water and about 50 ml of dimethylformamide (DMF). About 51.75 g AMPS was slowly added, with vigorous stirring, to this chilled suspension. Additional DMF, about 275 ml, was added to this mixture, followed by the addition of approximately 1 g of decolorizing charcoal. The mixture was heated to 50°–55° C. for 20 mins. The charcoal was removed by filtration through Celite. The DMF solution of KAMPS was transferred to a vented addition funnel which led into the polymerization apparatus described in Example 1. The KAMPS solution in the addition funnel was purged with $N_2$ for about 30 mins. Approximately one-half of this solution was dropped into the polymerization vessel containing about 25 g of isobutyl vinyl ether. This stirred mixture was purged for approximately 15 mins. while heating to 55°–60° C. The polymerization was then initiated by addition of 200 mg of AIBN. After 1 hour, one-half of the remaining KAMPS solution was added from the addition funnel, the last portion of the KAMPS solution was added after an additional 75 mins. A last charge of AIBN (100 mg) was added 5.5 hrs. after the initial AIBN addition. The polymerization was continued overnight at 55°–60° C.

The product from this polymerization was recovered by filtration and washing with hexane and drying in vacuo. If the product of the solution polymerization is not solid, treatment with methanol converts it to a product that is handled with no difficulty. Alternatively, the whole of the DMF polymer suspension can be triturated into methanol in a Waring blender. The viscosity (Brookfield) of a 10% aqueous solution of this polymer is 17.5 centipoise at 25° C.

EXAMPLE 3

Preparation of a Nylon 6 Polymer Containing a Copolymer of n-Butyl Vinyl Ether:KAMPS A solution of 7.5 g of a copolymer of potassium AMPS (potassium 2-acrylamido-2-methylpropanesulfonate):n-butyl vinyl ether was prepared using 15 ml of distilled water to dissolve the copolymer. The copolymer contained 10.2% potassium and was prepared as in Example 2. The copolymer solution was added to a mixture of 300 g of caprolactam, 0.240 g of benzoic acid (molecular weight regulator), and 0.015 g of manganese acetate (light stabilizer) in a 1-liter glass reactor equipped with an agitator and distilling head. The mixture was maintained under a flow of dry nitrogen and heated to 265° C. by means of a Dowthern A boiler. The mixture was stirred at 100 rpm for 4 hours to assist in removal of water and to disperse the copolymer in the mixture; the stirring was then continued at 30 rpm for an additional 18 hours.

The resulting light yellow homogeneous polymer was extruded as a monofilament into a water bath. The polymer mass was ground and boiled with 5 changes of distilled water to remove low molecular weight material. The purified polymer was dried in vacuo at 75° C. for 24 hours; the polymer had a relative viscosity of 2.10, an amine end group concentration of 4.8 meg/113 g, and a carboxylic acid end group concentration of 5.3 meg/113 g.

The nylon polymer prepared above was melt spun in normal fashion to yield a 6 filament-30 denier yarn. A yarn potassium concentration of 0.345% indicated quantitative retention of the n-butyl vinyl ether:KAMPS copolymer through the rather severe polymerization and washing process.

A 2-ply yarn was made and knit into tubes which were dyed with red (Sevron Red GL), yellow (Basacryl Yellow RL), or blue (Genacryl Blue RGL) cationic dyes or a blue (Duranol Blue G) disperse dye. The dye fastness properties of the sample yarn on washing or exposure to ozone were equal to those exhibited by the control yarn; lightfastness of the cationic dyes was slightly better with the sample yarn than with the control yarn.

EXAMPLE 4

Preparation of a Nylon 6 Polymer Containing A Copolymer of Isobutyl Vinyl Ether:KAMPS An aqueous solution of 12 ml of distilled water and 7.5 g of an isobutyl vinyl ether copolymer (prepared as in Example 1) was incorporated in a nylon 6 polymer as described in Example 3. The resulting polymer had a relative viscosity of 2.07, an amine end group concentration of 6.8 meg/113 g, and a carboxylic end group concentration of 5.5 meg/113 g. The potassium concentration in the polymer increased from 0.30% before washing to 0.33% after washing of the ground nylon 6 preparation. The polymer was melt spun in a conventional manner and demonstrated the same dye properties as in Example 3.

EXAMPLE 5

Example 4 was repeated and the sulfur content of the nylon 6 containing the isobutyl vinyl ether:KAMPS copolymer, as determined by either microcoulometric or x-ray fluorescence methods, increased from 0.29% to 0.32% upon washing.

EXAMPLE 6

Example 3 was repeated and the nylon 6 containing a n-butyl vinyl ether:KAMPS copolymer showed an increase in sulfur content from 0.325% to 0.375% upon washing.

The properties of the prior art polymers are tabulated in Table I while those of the copolymers of the invention are shown in Table II.

TABLE I

Polymer Properties of Nylon 6 Containing Metal Salt of Polymers or Copolymers of AMPS

| Polymer # | Unwashed Polymers | | | | Washed Polymers | | | |
|---|---|---|---|---|---|---|---|---|
| | $RV^a$ | $[NH_2]^b$ | $[COOH]^b$ | % $M^d$ | RV | $[NH_2]^b$ | $[COOH]^b$ | % M |
| I | — | — | — | 0.2288% $S^c$ | — | — | — | 0.1924% S |
| II | — | — | — | 0.2554% S | — | — | — | 0.2436% S |
| III | — | — | — | 0.2820% S | — | — | — | 0.2619% S |
| IV | 1.84 | 4.5 | 3.1 | $0.16^d$ | — | 4.6 | 5.2 | 0.092 |
| V | 1.88 | 5.1 | 5.1 | 0.031 | 2.16 | 3.4 | 6.9 | 0.0154 |
| VI | | 4.1 | 4.1 | 0.32 | 2.02 | 5.3 | 5.4 | 0.15 |
| VII | 1.77 | 5.4 | 4.4 | 0.283 | 2.17 | 3.7 | 6.9 | 0.33 |
| VIII | 1.92 | 7.0 | 4.7 | 0.12 | 1.99 | 4.0 | 6.2 | 0.14 |
| IX | 1.93 | 4.9 | 2.7 | 0.17 | 2.88 | 4.1 | 4.8 | 0.16 |

$^a$Relative viscosity of nylon 6
$^b$meq/113 g
$^c$sulfur analysis by x-ray fluoresence
$^d$% metal The polymers of Table I had the following compositions:

I. Nylon 6 containing the lithium salt of AMPS prepared in accordance with Example 1 of U.S. Pat. No. 3,865,900.

II. Nylon 6 containing the sodium salt of AMPS prepared in accordance with Example 2 of U.S. Pat. No. 3,865,900.

III. Nylon 6 containing the lithium salt of AMPS prepared in accordance with Example 3 of U.S. Pat. No. 3,865,900.

IV. Nylon 6 containing a potassium salt of AMPS.

V. Nylon 6 containing a lithium salt of AMPS.

VI. Nylon 6 containing a potassium salt of a copolymer of AMPS and N-vinylpyrrolidone.

VII. Nylon 6 containing a potassium salt of a copolymer of AMPS and α-methyl styrene.

VIII. Nylon 6 containing a potassium salt of a copolymer of AMPS and α-methyl styrene.

IX. Nylon 6 containing a potassium salt of a copolymer of AMPS and α-methyl styrene.

The polymers of Table II had the compositions:

X. Nylon 6 containing a copolymer of AMPS and isobutyl vinyl ether of Example 4.

XI. Nylon 6 containing a copolymer of AMPS and isobutyl vinyl ether of Example 4.

XII. Nylon 6 containing a copolymer of AMPS and the isobutyl vinyl ether of Example 4.

XIII. Nylon 6 containing a copolymer of AMPS and n-butyl vinyl ether of Example 3.

XIV. Nylon 6 containing a copolymer of AMPS and isobutyl vinyl ether.

The physical properties of 30/6 yarns spun from nylon 6 containing metal salts of AMPS and from the metal salts of copolymers provided by this invention are recorded in Table III together with those of control yarn spun at the same time. The control yarn contained lithim 5-sulfoisophthalate, a commercially used cationic additive.

The mole percents of vinyl ether in each of the copolymers of Table II has been calculated from the % Metal data in Table II and are tabulated in Table IIa.

TABLE IIa

| Polymer # | % M | Mole % % K$^+$ | Vinyl Ether |
|---|---|---|---|
| X | .35 | 14.35 | 17 |
| XI | .30 | 12.3 | 40 |
| XII | .28 | 11.48 | 47 |
| XIII | Not Determined | — | — |
| XIV | .30 | 12.3 | 40 |

TABLE II

Polymer Properties of Nylon 6 Containing Vinyl Ether AMPS Copolymers

| Polymer # | Unwashed Polymers | | | | Washed Polymers | | | |
|---|---|---|---|---|---|---|---|---|
| | $RV^a$ | $[NH_2]^b$ | $[COOH]^b$ | % $M^c$ | RV | $[NH_2]$ | $[COOH]$ | % $M^c$ |
| X | 1.55 | 5.6 | 4.7 | 0.35 | 1.85 | 5.2 | 6.3 | 0.36 |
| XI | 1.63 | 5.0 | 3.6 | 0.30 | 2.07 | 6.8 | 5.5 | 0.33 |
| XII | 1.81 | 5.5 | 1.6 | 0.28 | 2.00 | 4.1 | 6.0 | 0.30 |
| XIII | 1.80 | 4.0 | 4.5 | d | 2.10 | 4.8 | 5.3 | 0.345 |
| XIV | 1.58 | 4.2 | 4.5 | 0.30 | 2.07 | 4.1 | 6.9 | 0.37 |

$^a$Relative viscosity of nylon 6
$^b$meq/113 g
$^c$of a metal
$^d$not analyzed: the amount detected in the fibers is consistent with quantitative retention of the additive.

TABLE III

Physical Properties of Yarn Containing Prior Art Additives and Additives Provided by this Invention

| Polymer # | | Greige Yarn | 140° C./30 min. | 140° C./60 min. | 80 hr. UV |
|---|---|---|---|---|---|
| V of Table I | RV | 2.34 | | | |
| | [NH$_2$] | 3.3 | | | |

TABLE III-continued
Physical Properties of Yarn Containing Prior Art Additives and Additives Provided by this Invention

| Polymer # | | Greige Yarn | 140° C./30 min. | 140° C./60 min. | 80 hr. UV |
|---|---|---|---|---|---|
| | [COOH] | 6.4 | | | |
| | ppm Li | 154.0 | | | |
| | Denier | 31.39 | 36.0 | 36.0 | 31.39 |
| | Tenacity (g/d) | 4.13 | 3.44 | 3.43 | 3.56 |
| | Elongation (%) | 37.1 | 38.6 | 39.5 | 18.9 |
| | Toughness (gcm/d) | 14.7 | 10.5 | 10.1 | 5.4 |
| VI of Table I | RV | 2.21 | | | |
| | [NH$_2$] | 5.3 | | | |
| | [COOH] | 5.5 | | | |
| | ppm K | 1950 | | | |
| | Denier | 46.89 | 67.0 | 53.0 | 46.89 |
| | Tenacity | 2.57 | 1.13 | 1.23 | 2.40 |
| | Elongation | 61.3 | 80.1 | 47.4 | 61.2 |
| | Toughness | 14.0 | 8.8 | 5.5 | 13.3 |
| Control | RV | 2.42 | | | |
| | [NH$_2$] | 4.7 | | | |
| | [COOH] | 7.1 | | | |
| | ppm Li | 391 | | | |
| | Denier | 33.59 | 40.0 | 38.0 | 33.59 |
| | Tenacity | 5.31 | 3.90 | 3.93 | 4.71 |
| | Elongation | 34.6 | 37.2 | 36.7 | 23.4 |
| | Toughness | 17.1 | 10.2 | 10.2 | 9.4 |
| VII of Table I | RV | 2.49 | | | |
| | [NH$_2$] | 4.4 | | | |
| | [COOH] | 5.8 | | | |
| | ppm K | 3400 | | | |
| | Denier | 30.69 | 33.0 | 34.0 | 30.69 |
| | Tenacity | 4.91 | 3.88 | 3.66 | 3.73 |
| | Elongation | 26.1 | 29.7 | 28.6 | 18.2 |
| | Toughness | 11.7 | 7.8 | 6.8 | 5.4 |
| Control | RV | 2.37 | | | |
| | [NH$_2$] | 4.2 | | | |
| | [COOH] | 7.1 | | | |
| | ppm Li | 448 | | | |
| | Denier | 32.09 | 36.0 | 36.0 | 32.09 |
| | Tenacity | 5.49 | 3.86 | 3.61 | 4.84 |
| | Elongation | 40.8 | 31.8 | 30.2 | 29.6 |
| | Toughness | 20.7 | 8.1 | 7.0 | 12.8 |
| XII of Table II | RV | 2.34 | | | |
| | [NH$_2$] | 4.7 | | | |
| | [COOH] | 6.7 | | | |
| | ppm K | — | | | |
| | Denier | 33.29 | 35.0 | 35.0 | 33.29 |
| | Tenacity | 4.77 | 4.36 | 4.26 | 4.11 |
| | Elongation | 29.7 | 37.2 | 37.3 | 14.8 |
| | Toughness | 13.4 | 12.3 | 12.2 | 4.7 |
| Control | RV | 2.42 | | | |
| | [NH$_2$] | 4.7 | | | |
| | [COOH] | 6.9 | | | |
| | ppm Li | — | | | |
| | Denier | 31.79 | 33.0 | 33.0 | 31.79 |
| | Tenacity | 5.11 | 4.74 | 4.48 | 4.27 |
| | Elongation | 38.5 | 53.1 | 53.6 | 23.5 |
| | Toughness | 18.3 | 21.2 | 20.0 | 8.9 |
| XI of Table II | RV | 2.33 | | | |
| | [NH$_2$] | 4.4 | | | |
| | [COOH] | 5.9 | | | |
| | ppm K | 3300 | | | |
| | Denier | 32.09 | 34.0 | 35.0 | 32.09 |
| | Tenacity | 4.38 | 3.77 | 3.55 | 3.81 |
| | Elongation | 37.4 | 39.6 | 42.6 | 24.5 |
| | Toughness | 15.5 | 11.7 | 12.4 | 8.0 |
| XIII of Table II | RV | 2.27 | | | |
| | [NH$_2$] | 4.4 | | | |
| | [COOH] | 5.9 | | | |
| | ppm K | 3450 | | | |
| | Denier | 30.80 | 34.0 | 34.0 | 30.80 |
| | Tenacity | 4.28 | 3.56 | 3.60 | 4.01 |
| | Elongation | 36.2 | 28.3 | 28.5 | 25.6 |
| | Toughness | 14.8 | 7.0 | 7.0 | 8.7 |
| Control | RV | 2.37 | | | |
| | [NH$_2$] | 4.2 | | | |
| | [COOH] | 7.1 | | | |
| | ppm Li | 448 | | | |
| | Denier | 32.09 | 36.0 | 36.0 | 32.09 |
| | Tenacity | 5.49 | 3.86 | 3.61 | 4.84 |
| | Elongation | 40.8 | 31.8 | 30.2 | 29.6 |

TABLE III-continued

| Polymer # | | Greige Yarn | 140° C./30 min. | 140° C./60 min. | 80 hr. UV |
|---|---|---|---|---|---|
| | Toughness | 20.7 | 8.1 | 7.0 | 12.8 |

Physical Properties of Yarn Containing Prior Art Additives and Additives Provided by this Invention It is apparent from a comparison of the percentages of metal in nylon 6 containing the metal salt of a vinyl ether-AMPS copolymer with that of nylon 6 containing KAMPS or a metal salt of an AMPS copolymer disclosed in U.S. Pat. No. 3,865,900 before and after washing of the nylon 6 compositions that the copolymer of this invention is retained in a larger percentage after washing than those of the prior art. Also, the invention provides the further advantage that polymerization of the caprolactam can be conducted in accordance with conventional polymerization processes without reduction in sulfur retention.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A polycaproamide receptive to cationic dyes containing about 1 to about 5 percent by weight of a metal salt of a vinyl ether copolymer of 2-acrylamido-2-methylpropanesulfonic acid said metal being selected from Group Ia of the Periodic Table, said copolymer comprising from 17 to 47 mole percent of said vinyl ether monomer.

2. The polycaproamide of claim 1 containing from about 1 to about 5 percent by weight of the copolymer.

3. The polycaproamide of claim 1 wherein the said copolymer is a copolymer of a vinyl ether containing 4 to 20 carbon atoms and 2-acrylamido-2-methylpropanesulfonic acid.

4. The polycaproamide of claim 1 wherein the polycaproamide is shaped as a fiber.

5. The polycaproamide of claim 1 wherein the vinyl ether copolymerized with 2-acrylamido-2-methylpropanesulfonic acid is a butyl vinyl ether.

6. A method for improving the receptivity of a polycaproamide to cationic dyes which comprises mixing with the polycaproamide about 1 to about 5 percent by weight of a metal salt of a copolymer containing from 17 to 47 mole percent of a vinyl ether and the remainder 2-acrylamido-2-methylpropanesulfonic acid, said metal being selected from Group Ia of the Periodic Table.

7. The method of claim 6 wherein from about 1 to about 5 percent by weight of the copolymer is mixed with the polycaproamide.

8. The method of claim 6 wherein the copolymer is a copolymer of a vinyl ether containing 4 to 20 carbon atoms and 2-acrylamido-2-methylpropanesulfonic acid.

9. The method of claim 6 wherein the polycaproamide is a fiber.

10. The method of claim 6 wherein the vinyl ether is a butyl vinyl ether.

11. A method for making a polycaproamide fiber having improved affinity for cationic dyes which comprises mixing with the polycaproamide about 1 to about 5 percent by weight of a metal salt of a copolymer containing from 17 to 47 mole percent of a vinyl ether and the remainder 2-acrylamido-2-methylpropanesulfonic acid, said metal being selected from Group Ia of the Periodic Table.

* * * * *